United States Patent [19]

Beakas et al.

[11] Patent Number: 4,901,562
[45] Date of Patent: Feb. 20, 1990

[54] VEHICLE WHEEL SPEED SENSOR FOR A DRIVE AXLE

[75] Inventors: Mark L. Beakas, Auburn; Delmar L. Kerney, Fort Wayne; Kraig J. Schlosser, Auburn, all of Ind.; Geoffrey T. Paton, Ontario, Canada; Vernon E. Oechsle, Sylvania, Ohio; Marvin A. Franklin, III, Fort Wayne, Ind.

[73] Assignee: Dana Corporation, Toledo, Ohio

[21] Appl. No.: 332,524

[22] Filed: Mar. 31, 1989

[51] Int. Cl.$^4$ ............................................. G01M 19/00
[52] U.S. Cl. ..................................... 73/118.1; 324/174
[58] Field of Search .................... 73/118.1; 188/181 R, 188/181 C; 303/93, 94, 95, 96, 97, 98, 99, 100; 324/174

[56] References Cited

U.S. PATENT DOCUMENTS

| | | | |
|---|---|---|---|
| 3,317,765 | 5/1967 | Cone | 310/74 |
| 3,469,662 | 9/1969 | Dewar | 188/181 |
| 3,473,120 | 10/1969 | Rouf | 324/70 |
| 3,482,129 | 12/1969 | Riordan | 310/67 |
| 3,489,935 | 1/1970 | Hayes | 310/44 |
| 3,745,392 | 7/1973 | Phoenix et al. | 310/168 |
| 3,772,547 | 11/1973 | Abate | 310/168 |
| 3,772,549 | 11/1973 | Cumming | 310/168 |
| 3,772,550 | 11/1973 | Anselmino | 310/168 |
| 4,090,592 | 5/1978 | Jorick et al. | 188/181 R |
| 4,184,071 | 1/1980 | Fryer et al. | 250/231 SE |
| 4,365,152 | 12/1982 | Gergek | 250/231 SE |
| 4,488,075 | 12/1984 | DeCesare | 310/156 |
| 4,563,046 | 1/1986 | Shimamoto | 308/10 |
| 4,689,990 | 9/1987 | Hofler et al. | 73/118.1 |
| 4,704,523 | 11/1987 | Uchida | 250/231 SE |

FOREIGN PATENT DOCUMENTS

2740464  3/1979  Fed. Rep. of Germany ..... 73/118.1

Primary Examiner—Jerry W. Myracle
Attorney, Agent, or Firm—Marshall & Melhorn

[57] ABSTRACT

An apparatus for sensing the angular velocity of a vehicle wheel includes a rotor disk, a mounting bracket for attachment to the inner wall of an axis housing, and an electromagnetic sensor. The disk is coupled to the axle shaft for rotation and is rotatably retained in a cavity formed in the bracket. A mounting tube is also formed in the mounting bracket for retaining the electromagnetic sensor in close proximity to a periphery of the disk which has a plurality of generally radially extending evenly spaced indicating means formed thereon. The cavity limits axial movement of the disk to maintain the air gap between the disk and the sensor. The disk can be coupled to the axle by a pair of rings and a tab and slot system to limit radial movement of the disk.

20 Claims, 7 Drawing Sheets

VEHICLE WHEEL SPEED SENSOR FOR A DRIVE AXLE

BACKGROUND OF THE INVENTION

The invention relates in general to an apparatus for sensing vehicle wheel angular speed and, in particular, to such an apparatus for use in an antilock brake control system.

Vehicle antilock braking systems respond to signals representing the angular velocity of one or more wheels of the vehicle. Typically, a wheel speed sensor includes at least one magnet mounted on a stationery portion of the vehicle and a toothed or slotted metal rotor which rotates in response to the wheel movement and which is located adjacent the sensing device. As the rotor teeth or slots pass the sensing device, variations in the magnetic flux produce a voltage the frequency of which is a function of the angular velocity of the wheel and the number of teeth or slots in the rotor.

In order to generate a voltage level which provides an accurate indication of the speed, the sensing device and the rotor must be accurately positioned with respect to one another during initial assembly and they must remain in this relationship even after extended periods of operation in which the components are subjected to road shocks and repeated vibrations. Therefore, most wheel speed sensors are mounted in the area of the wheel. However, such a location requires that additional care be taken not to damage the sensor during wheel maintenance.

As an alternative, the rotor can be directly mounted on the axle shaft and the sensing device mounted on the differential housing of a drive axle. However, such a mounting location also creates other problems. During initial installation of the axle, the axle shaft must be inserted into the differential through the interior of the drive axle housing. Thus, great potential exists for damaging the sensor either during installation or removal for maintenance. Furthermore, since the end of the drive axle housing adjacent the wheel has an inside diameter only slightly larger than the outside diameter of the axle shaft, the size of the rotor is limited if it is to be mounted on the drive axle before assembly to the differential.

Another problem exists where better braking control and shorter stopping distances are desired. Such system performance demands a higher number of teeth on the rotor for better resolution. Thus, the distance between the sensing device and the rotor must be minimized and maintained within predetermined limits throughout the rotor rotation. The normal manufacturing tolerances for an axle shaft and the side gears of the differential tend to militate against the maintenance of the proper spacing or "air gap".

SUMMARY OF THE INVENTION

In view of the above-identified problems, it is an object of the present invention to provide a wheel speed sensor for a drive axle which can be located inwardly of the wheel in an axle shaft housing. Such a sensor can be installed when the differential is assembled and prior to the insertion of the drive axles.

The speed sensor according to the present invention includes a mounting bracket which defines a cavity for enclosing a rotor disk and retaining the disk adjacent an electromagnetic sensor in a drive axle housing. The cavity permits the necessary radial movement of the axle shaft while limiting the axial movement to a maximum air gap between the disk and the sensor. The mounting bracket includes a mounting flange for attaching the speed sensor to the inside of an axle shaft housing. The electromagnetic sensor is retained by a mounting tube formed in the bracket in close proximity to the path of travel of the periphery of the disk for generating a speed signal. The rotor disk is splined to the drive axle shaft for rotation at the angular speed of the associated wheel.

The rotor disk can be of any equivalent forms. If the disk is formed of a metallic material, any type of radially extending speed indicating means such as slots or teeth can be formed thereon for changing the magnetic field in the area of the sensor as the disk is rotated. If the disk is formed of a non-metallic material, metallic inserts can be utilized to generate the magnetic field changes. Also, any equivalent means of driving the disk can be utilized such as a key and slot in place of the spline.

In alternate embodiments of the invention, a toothed signal generator disk can be utilized in conjunction with an internally splined shaft coupling ring for engaging the drive axle shaft. The disk and the ring are coupled together through an intermediate ring by means of a tab and slot system. This alternate form of driving the disk enables the radial movement of the disk to be limited without changing the radial tolerances on the axle.

It is an object of the present invention to provide a vehicle wheel speed sensor having a minimum of parts and being economical to manufacture.

It is another object of the present invention to provide a vehicle wheel speed sensor which can be mounted in a location protected from road hazards and protected during normal servicing of the vehicle.

It is a further object of the present invention to provide a vehicle wheel speed sensor which requires no major modifications to the vehicle components to be installed and used and does not effect the serviceability of the vehicle axle.

It is another object of the present invention to provide a vehicle wheel speed sensor which controls the air gap between a stationary electromagnetic sensor and a disk rotated by the drive axle of the vehicle while not inhibiting the radial deflection of and not unduly loading the axle shaft of the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
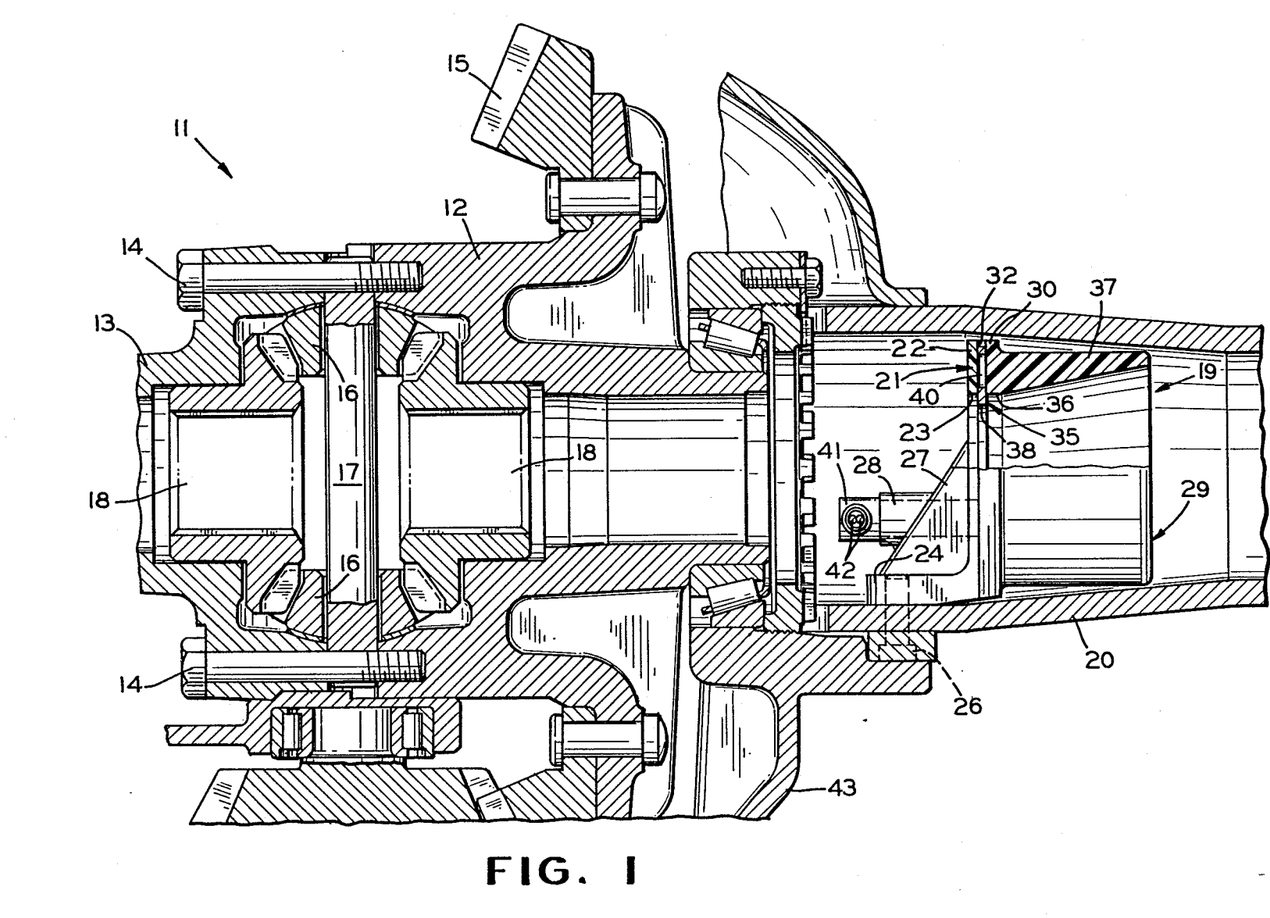
FIG. 1 is a fragmentary sectional view of a differential carrier assembly incorporating a wheel speed sensor according to the present invention.

There is shown in FIG. 1 a fragmentary sectional view of a differential carrier assembly 11 including a differential case formed of a flange half 12 and a cap half 13. A plurality of threaded fasteners such as bolts 14 extend through apertures formed in the case half 13 and threadably engage threaded apertures formed in the case half 12. A ring gear 15 is attached to the flange case half 12 for rotation by a pinion gear (not shown) driven by a drive shaft (not shown) of the vehicle. A pair of differential pinion gears 16 are journaled on a differential spider 17 and are located inside the case halves 12 and 13. The differential pinion gears 16 engage a pair of side gears 18 which are internally splined for coupling to the inner ends of a pair of drive axle shafts (not shown). Although two pinion gears 16 are shown, any number of gears could be utilized such as a set of four which are commonly used in heavy truck axles.

Since the vehicle wheels are driven by the drive axle shafts, the rotation of the axle shafts can be sensed in order to generate a signal representing the angular speed of the vehicle wheels. A pair of speed sensors according to the present invention are mounted in the carrier assembly 11, one in each of the differential housing legs. Since the speed sensors are similar, only one sensor 19 is shown. Furthermore, in addition to the spline formed on the axle shaft for engaging the side gears 18, a second similar spline must be formed on the axle shaft to engage the sensor rotor disk as is discussed below.

Figure 2:
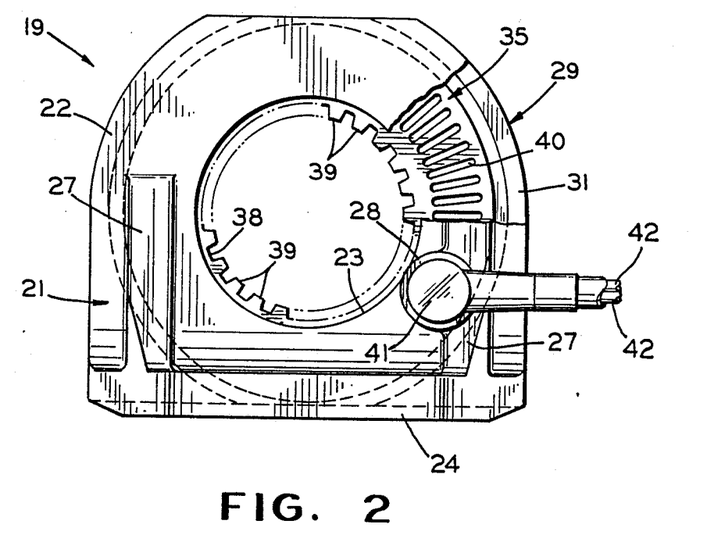
FIG. 2 is a fragmentary side elevational view of the speed sensor shown in FIG. 1.
Figure 3:
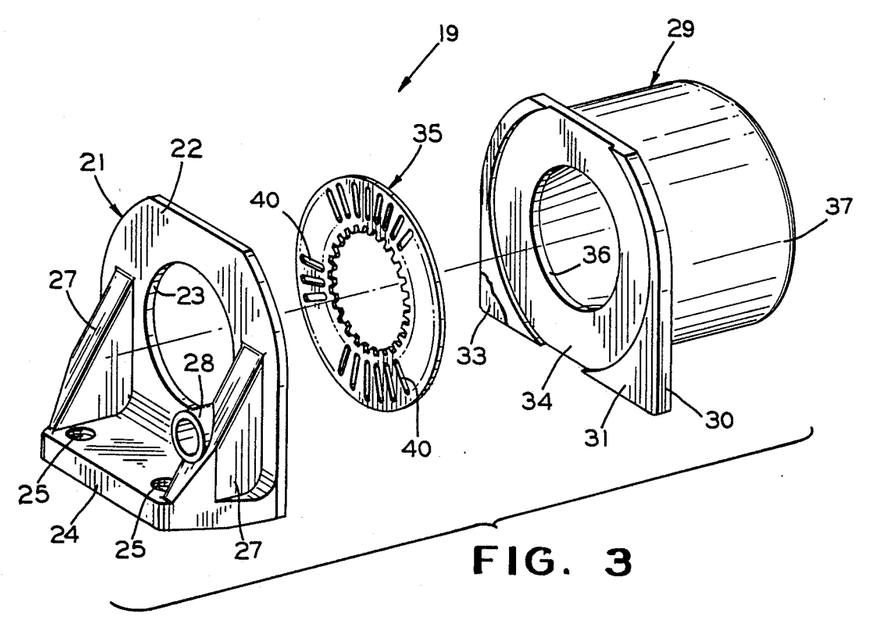
FIG. 3 is an exploded perspective view of the retaining brackets and the rotor disk of the speed sensor shown in FIG. 2.

Referring to FIGS. 1 through 3, the speed sensor 19 can be mounted inside a housing 20 for the drive axle shaft. The sensor 19 includes a mounting bracket having an inner bracket 21 which includes a generally planar retaining plate 22 having a central aperture 23 formed therein for receiving the drive axle shaft. A generally outwardly extending flange 24 is formed along one edge of the plate 22 for mounting to the interior wall of the axle housing 20. A pair of apertures 25 are formed in the flange 24 and are threaded for retaining fasteners such as a bolt 26 (FIG. 1) extending through the wall of the housing 20. Connected between the plate 22 and the flange 24 are a pair of bracing walls 27 on opposite sides of the aperture 23. The bracket 21 also includes a mounting tube 28 having a central aperture with a longitudinal axis generally parallel to a longitudinal axis of the aperture 23.

The mounting bracket of the speed sensor 19 also includes an outer bracket 29 which is attached to the inner bracket 21. The bracket 29 includes a retaining plate 30 which is generally planar and has a surface 31 which abuts a facing surface 32 (FIG. 1) of the retaining plate 22. The brackets 21 and 29 can be attached by any suitable means such as fasteners, welding, or an adhesive 33 (FIG. 3) between the surfaces 31 and 32.

As best seen in FIG. 3, the surface 31 has a recessed area 34 formed therein for retaining a rotor disk 35. The recessed area 34 is generally circular in shape and is concentric with an aperture 36 formed in the plate 30 and the aperture 23 formed in the plate 22. Thus, the facing parallel walls of the surface 32 and the recess 34, and the arcuate end wall of the recessed area 34 define a cavity which limits the movement of the rotor disk 35 axially, but is sized not to limit movement radially. Formed on the opposite side of the plate 30 is a tubular body 37. The body 37 is internally tapered from a larger diameter at an outer end to a smaller diameter at an inner end at the plate 30 for guiding the drive axle shaft toward the rotor disk 35 and the side gear 18.

The rotor disk 35 is typically formed of a metallic material and has a central aperture 38 formed therein of a diameter corresponding to the outer diameter of the drive axle shaft. The axle shaft has a second external spline (not shown) formed thereon for engaging a plurality of radially inwardly extending teeth 39 formed about the periphery of the aperture 38. Thus, the rotor disk 35 is prevented from relative rotational movement with respect to the axle shaft. The disk 35 also has speed indicating means in the form of a plurality of generally radially extending, evenly spaced slots 40 formed in a circle about the aperture 38 adjacent the periphery of the disk.

An electromagnetic sensor 41 extends into and is retained by the aperture formed in the mounting tube 28 of the inner mounting bracket 21. The sensor 41 extends into close proximity with the slots 40 of the disk 35. The sensor 41 can be retained by any suitable means such as epoxy material, a threaded case and threaded aperture, or molding integral with the bracket 21. If the sensor is potted directly into the tube 28, a circumferential groove to prevent axial movement and a keyway to prevent rotation can be provided in the wall of the aperture. A pair of wires 42 lead from the sensor 41 and can extend through the axle shaft housing 20 to provide a speed signal to a control circuit (not shown). Typically, a seal is provided where the wires 42 exit the housing 20.

Figure 4:
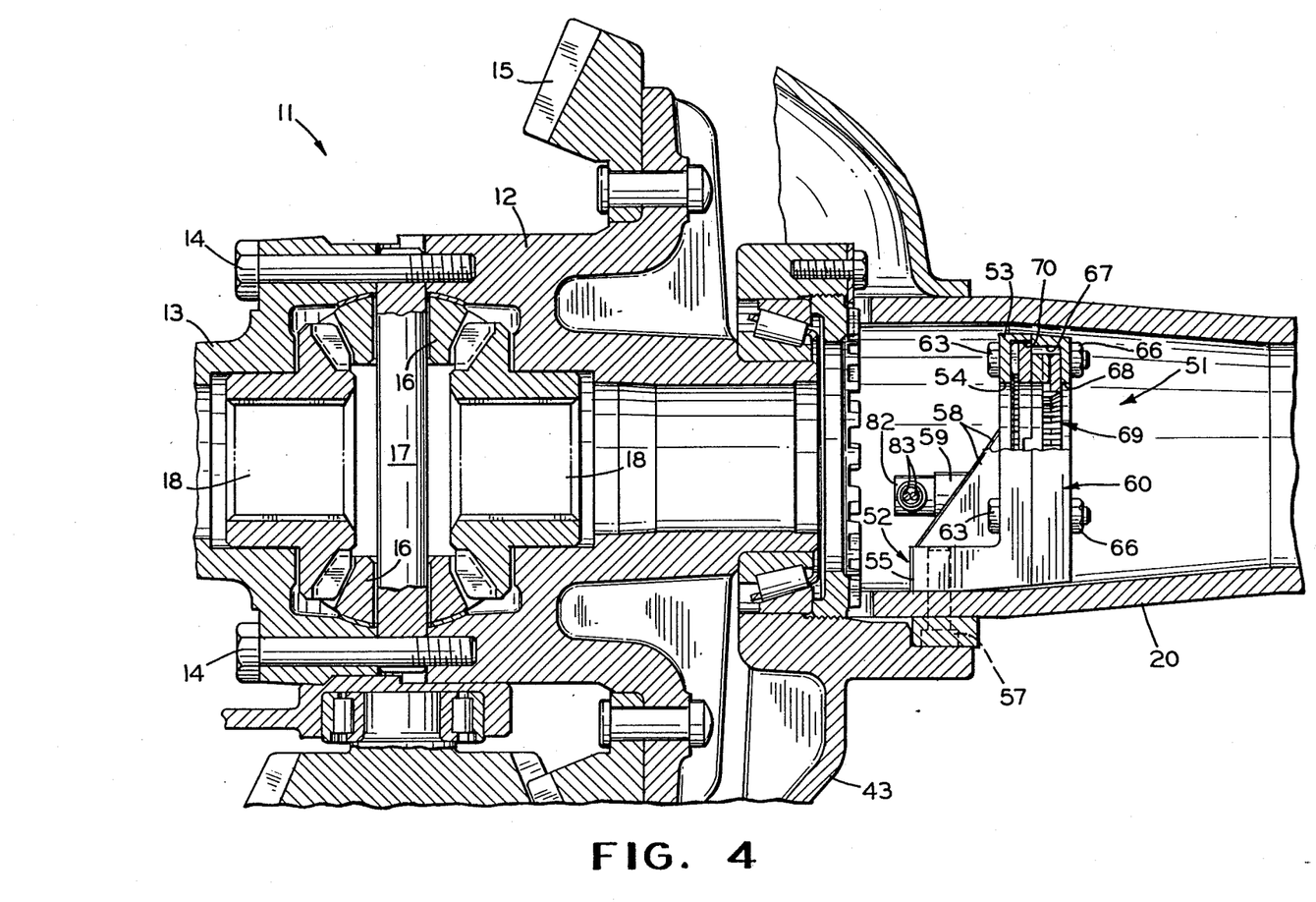
FIG. 4 is a fragmentary sectional view similar to FIG. 1 showing an alternate embodiment of the present invention.
Figure 5:
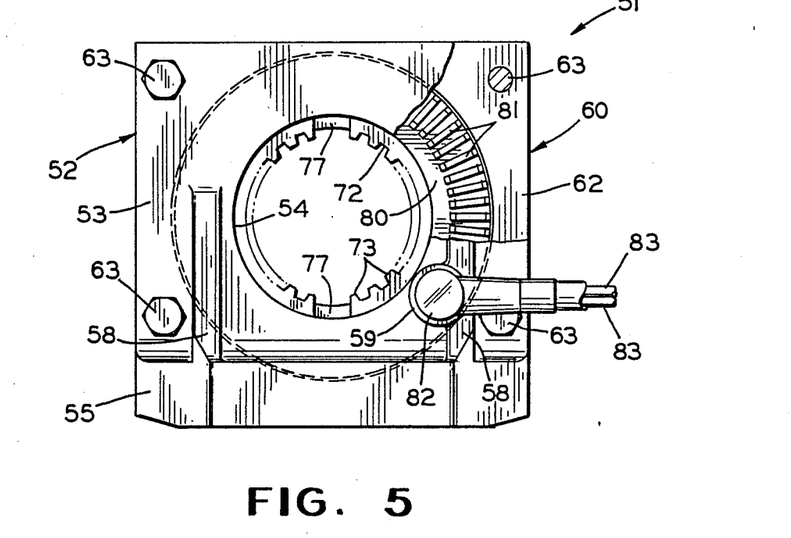
FIG. 5 is a fragmentary side elevational view of the speed sensor shown in FIG. 4.
Figure 6:
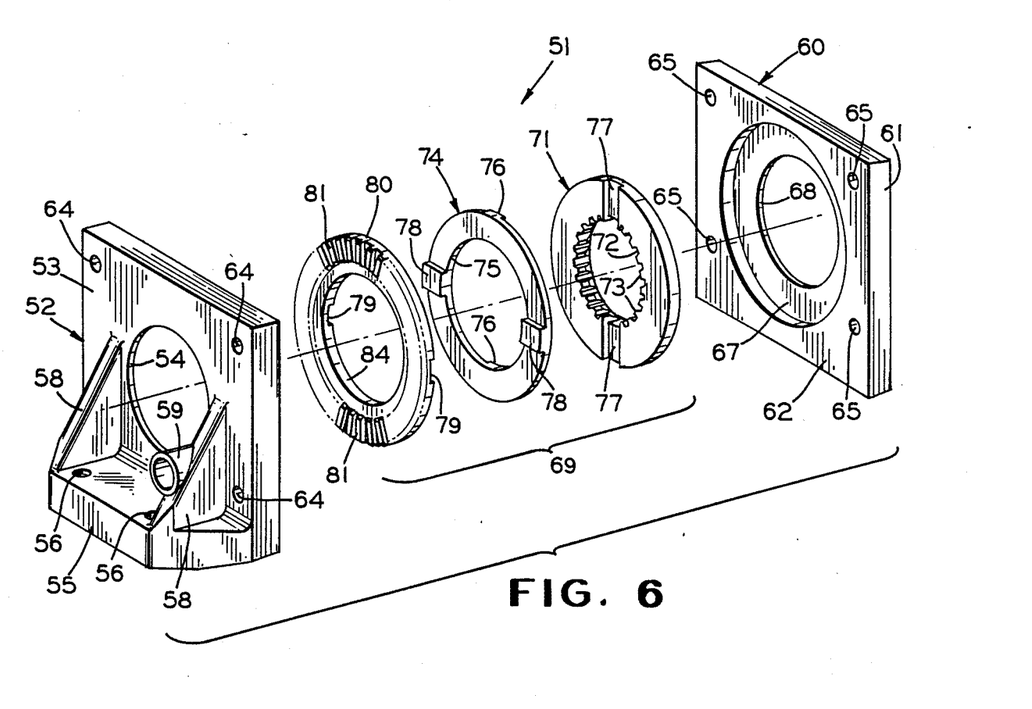
FIG. 6 is an exploded perspective view of the retaining brackets and the rotor disk of the speed sensor shown in FIG. 5.

An alternate embodiment of the present invention is shown in FIGS. 4 through 6. FIG. 4 is a fragmentary sectional view of the differential carrier assembly 11 including the differential case halves 12 and 13, and the side gears 18. As in FIG. 1, a pair of speed sensors are utilized, but only a speed sensor 51 is shown. Referring to FIGS. 4 through 6, the speed sensor 51 can be mounted inside the housing 20 for the drive axle shaft. A mounting bracket has an inner bracket 52 which includes a generally planar retaining plate 53 having a central aperture 54 formed therein for receiving the drive axle shaft. A generally outwardly extending flange 55 is formed along one edge of the plate 53 for mounting to the interior wall of the axle housing 20. A pair of apertures 56 are formed in the flange 55 and are threaded for retaining fasteners such as a bolt 57 (FIG. 4) extending through the wall of the housing 20. Connected between the plate 53 and the flange 55 are a pair of bracing walls 58 on opposite sides of the aperture 54. The bracket 52 also includes a mounting tube 59 having a central aperture with a longitudinal axis generally parallel to a longitudinal axis of the aperture 54.

The speed sensor mounting bracket also includes an outer bracket 60 which is attached to the inner bracket 53. The bracket 60 includes a retaining plate 61 which is generally planar and has a surface 62 which abuts a facing surface (FIG. 1) of the retaining plate 53. The brackets 52 and 60 can be attached by any suitable means such as fasteners including a plurality of bolts 63 which extend through apertures 64 formed in the retaining plate 53 and corresponding apertures 65 formed in the retaining plate 61. Each of the bolts 63 engages a nut 66 for holding the brackets 52 and 60 together.

As best seen in FIG. 6, the surface 62 has a recessed area 67 formed therein which is generally circular in shape and is concentric with an aperture 68 formed in the plate 61 and the aperture 54 formed in the plate 53. Formed in the plate 53 is a recessed area 70 which is generally circular in shape and is concentric with the aperture 54. The recessed areas 67 and 70 cooperate to define a cavity to rotatably retain a rotor disk assembly 69. The disk 35 of FIGS. 1-3 tends to exhibit excessive radial runout which causes a frequency modulation which, in turn, causes false firing of the solenoids used in anti-lock braking systems. In order to avoid frequency modulation, it has been found that the radial runout should be 0.025 inch or less. As explained below, the rotor disk assembly 69 is designed to limit radial runout of the signal generator disk without inhibiting radial movement of the axle shaft.

The rotor disk assembly 69 is formed of three rings or disks. A shaft coupling ring 71 is disk-shaped with a central aperture 72 formed therein. A plurality of teeth 73 are formed about the wall of the central aperture 72 for engaging a second splined surface formed on the exterior of the drive axle shaft (not shown). Thus, the coupling ring 71 is driven in rotation by the drive axle shaft. An intermediate ring 74 has a central aperture 75 formed therein of a diameter which does not restrict radial movement of the drive axle shaft. The intermediate ring 74 also has two pairs of generally axially extending tabs formed thereon. A first pair of diametrically opposed tabs 76 extend toward the shaft coupling ring 71 to engage a pair of slots 77 formed in the ring 71. A second pair of diametrically opposed outwardly extending tabs 78 is formed on the opposite side of the ring 74 approximately ninety degrees from the tabs 76 to accommodate radial movement in any direction. The tabs 78 engage a pair of radially extending slots 79 formed in a signal generator disk 80.

The disk 80 has indicating means formed as a plurality of evenly spaced radially extending teeth 81 formed adjacent a periphery of the disk and about a central aperture 84 of a diameter which does not restrict radial movement of the drive axle shaft. The recessed area 67 is smaller in diameter than the recessed area 70 and the rings 71 and 74 are smaller in diameter than the disk 80. The rings 71 and 74 fit completely within the recessed area 67 and the disk 80 fits completely within the recessed area 70 such that the surface 62 and the facing wall of the recessed area 70 control the air gap as discussed in more detail in connection with FIG. 11.

An electromagnetic sensor 82 extends into and is retained by the aperture formed in the mounting tube 59 of the inner mounting bracket 52. The sensor 82 extends into close proximity with the teeth 81 of the disk 80. A pair of wires 83 lead from the sensor 82 and can extend through the axle shaft housing 20 or a differential housing 43 (FIG. 4) to provide a speed signal to a control unit. The tabs and slots enable the radial movement of the disk 80 to be controlled as required to generate a reliable signal while the radial movement of the axle and the ring 71 can be much greater to accommodate manufacturing tolerances, axle runout and deflection.

Figure 7:
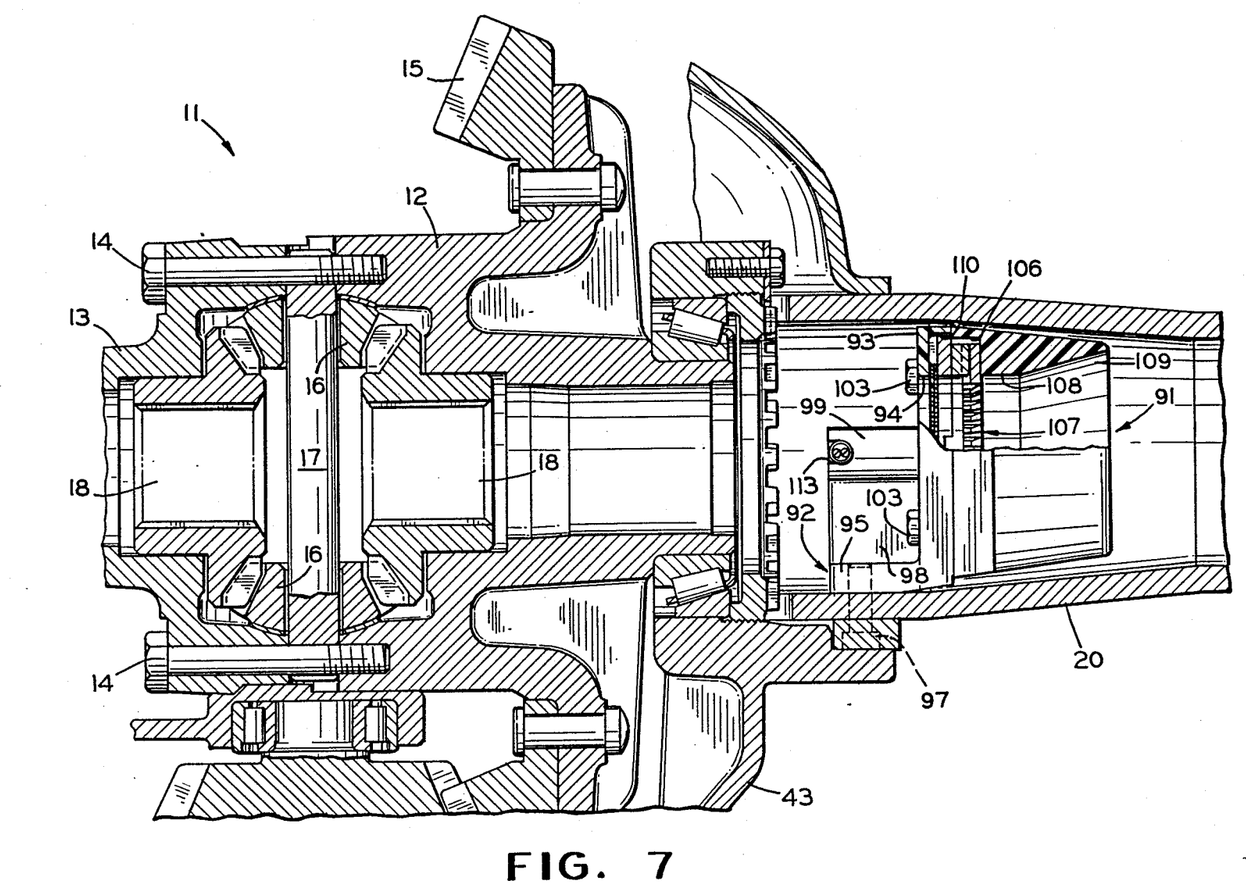
FIG. 7 is a fragmentary sectional view similar to FIG. 1 showing a second alternate embodiment of the present invention.
Figure 8:
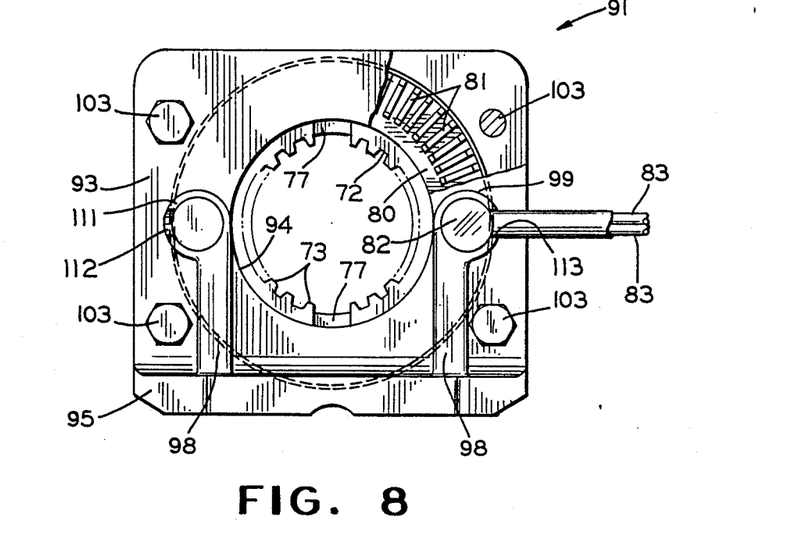
FIG. 8 is a fragmentary side elevational view of the speed sensor shown in FIG. 7.
Figure 9:
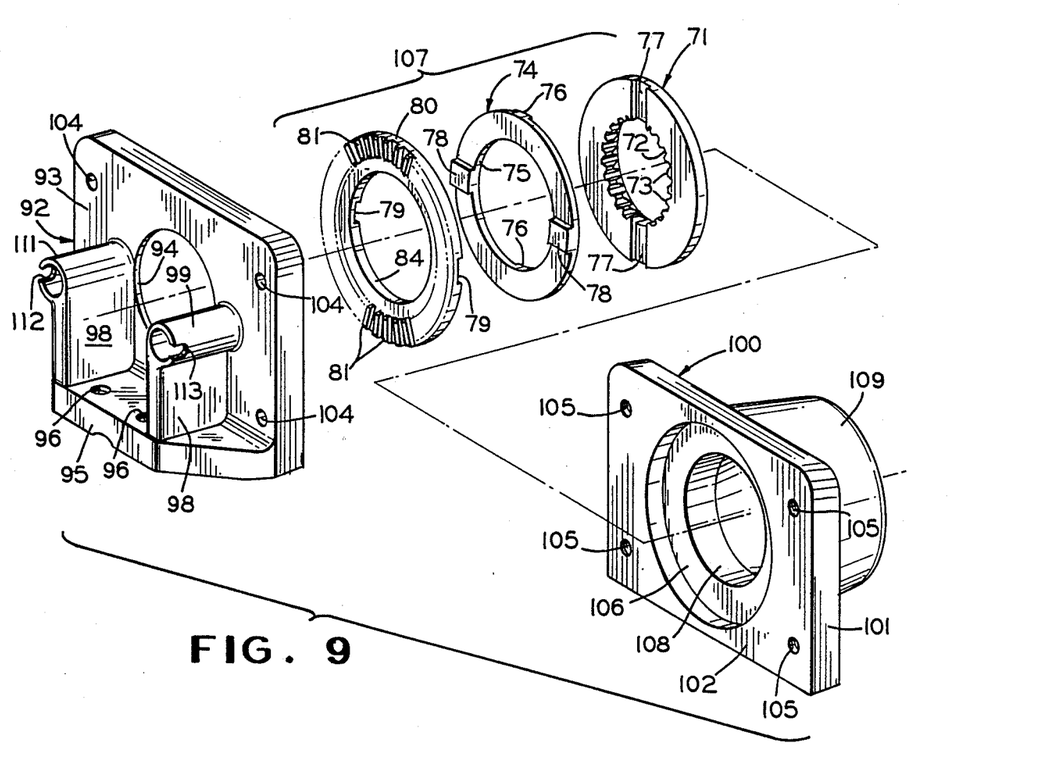
FIG. 9 is an exploded perspective view of the retaining brackets and the rotor disk of the speed sensor shown in FIG. 8.

Referring to FIGS. 7 through 9, a second alternate embodiment speed sensor 91 can be mounted inside the housing 20 for the drive axle shaft. A mounting bracket includes an inner bracket 92 having a generally planar retaining plate 93 with a central aperture 94 formed therein for receiving the drive axle shaft. A generally outwardly extending flange 95 is formed along one edge of the plate 93 for mounting to the interior wall of the axle housing 20. A pair of apertures 96 are formed in the flange 95 and are threaded for retaining fasteners such as a bolt 97 (FIG. 7) extending through the wall of the housing 20. Connected between the plate 93 and the flange 94 are a pair of bracing walls 98 on opposite sides of the aperture 94. The bracket 92 also includes a mounting tube 99 having a central aperture with a longitudinal axis generally parallel to a longitudinal axis of the aperture 94.

The mounting bracket of the speed sensor 91 also includes an outer bracket 100 which is attached to the inner bracket 92. The bracket 100 includes a retaining plate 101 which is generally planar and has a surface 102 which abuts a facing surface (FIG. 1) of the retaining plate 93. The brackets 92 and 100 can be attached by any suitable means such as fasteners in the form of bolts 103 extending through associated apertures 104 formed in the retaining plate 93 and threadably engaging threaded apertures 105 formed in the retaining plate 101.

As best seen in FIG. 9, the surface 102 has a recessed area formed therein for retaining a rotor disk assembly 107. The recessed area 106 is generally circular in shape and is concentric with an aperture 108 formed in the plate 102 and the aperture 94 formed in the plate 93. Formed on the opposite side of the plate 102 is a tubular body 109. The body 109 is internally tapered from a larger diameter at an outer end to a smaller diameter at an inner end at the plate 102 for guiding the drive axle shaft toward the disk assembly 107 and the side gear 18.

As shown in FIG. 7, a recessed area 110 is formed in the retaining plate 93 facing the recessed area 106. The recessed area 110 is generally circular and is concentric with the aperture 94. The recessed areas 106 and 110 cooperate and form a cavity to retain a rotor disk assembly 107. The assembly 107 can be similar to the assembly 69 shown in FIG. 6 incorporating the shaft coupling ring 71, the intermediate ring 74, and the signal generator disk 80.

The electromagnetic sensor 82 extends into and is retained by the aperture formed in the mounting tube 99 of the inner mounting bracket 92. The sensor 82 extends into close proximity with the teeth 81 formed on the disk 80. The pair of wires 83 lead from the sensor 82 and can extend through the axle shaft housing 20 to provide a speed signal to a control circuit (not shown). A second mounting tube 111 is formed on the opposite side of the central aperture 94 from the mounting tube 99. Thus, the mounting bracket can be utilized in both the right and the left axle housings. One sensor can be mounted in the tube 99 is one of the brackets and another sensor mounted in the tube 111 in the other bracket and the wires from each of the sensors can exit the axle shaft housing in the same relative locations. The second mounting tube can be used in any of the embodiments of the present invention to standardize parts and reduce pattern or mold requirements.

The mounting tubes 99 and 111 each extend along a longitudinal axis generally parallel to the axis of the central aperture 94 and the longitudinal axis of any axle extending through the mounting bracket and associated disk. A slot 112 is formed in an outwardly facing wall of the mounting tube 111 and extends generally parallel to the longitudinal axis of the tube. Similarly, a slot 113 is formed in an outwardly facing wall of the tube 99 for accepting and retaining the wires 83 connected to the sensor 82. Thus, the slot 113 cooperates with the wires 83 to prevent the sensor 82 from rotating in the tube.

Figure 10:
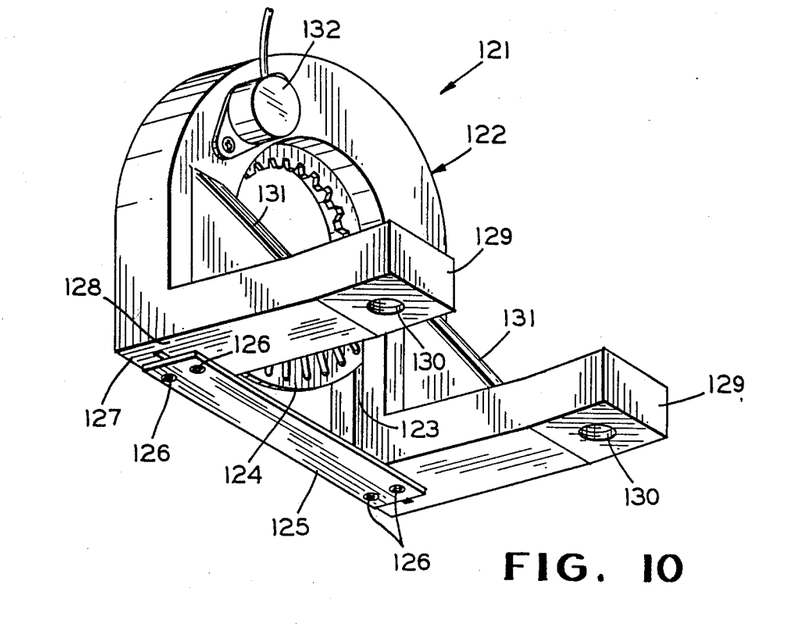
FIG. 10 is a perspective view of a third alternate embodiment of the present invention.

There is shown in FIG. 10 a third alternate embodiment of the present invention. The speed sensor 121 includes a mounting bracket having a generally U-shaped body 122 of any suitable cross-sectional shape, but shown as square or rectangular. An inwardly facing continuous groove 123 is formed in the body 122 and extends along the inner surfaces of the two legs and the connecting curved portion of the body. The groove 123 is dimensioned to form a cavity to retain a rotor disk 124. A retaining plate 125 is attached to the body 122 over the open ends of the groove 123 by any suitable means such as fasteners 126 to prevent the rotor disk 124 from rolling out of the groove 123 while the axle shaft is not installed.

The body 122 is separated by the groove 123 into an outer bracket portion 127 and an inner bracket portion 128. Extending at right angles, generally in the direction of the longitudinal axis of the axle shaft when installed in the axle housing, are a pair of bracket arms 129 which extend from the upper ends of the inner bracket portion 128. Each of the bracket arms 129 is provided with a mounting aperture 130 near its outer end for accepting any suitable fastener means for attachment to the axle housing. The body 122 can also be provided with a reinforcing rib 131 extending between an associated one of the bracket arms 129 and the inner bracket portion 128.

An electromagnetic sensor 132 is attached to the inner bracket portion 128. The sensor extends into a mounting tube formed as an aperture in the bracket 128 and into close proximity to the disk 124.

Figure 11:
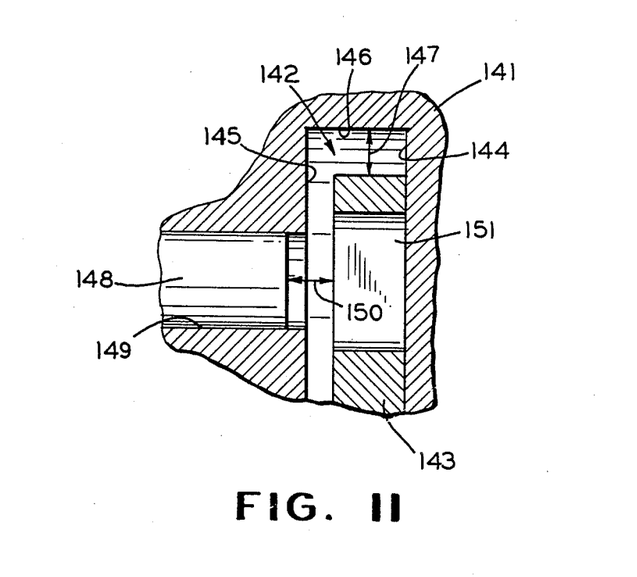
FIG. 11 is an enlarged, fragmentary cross-sectional view showing the relationship between the disk, the sensor and the walls of the disk enclosing cavity of the present invention.

FIG. 11 is an enlarged fragmentary cross-sectional view which is representative of the four embodiments of the speed sensor discussed above. A mounting bracket 141 defines a cavity 142 for retaining a rotor disk 143. The cavity 142 is defined by a pair of generally parallel opposed side walls 144 and 145 which are joined by an annular edge wall 146. The diameter of the cavity 142 is selected based upon the diameter of the rotor disk 143 and the maximum expected radial movement of the rotor disk as it is driven by the drive axle (not shown). Thus, a clearance represented by an arrow 147 is maintained between the periphery of the rotor disk 143 and the annular wall 146.

An electromagnetic sensor 148 is located in a mounting tube 149. The distance between the opposed walls 144 and 145 is selected such that when the rotor disk 143 is forced against the wall 144, the distance between the face of the sensor 148 and the signal generating means on the rotor disk 143, represented by an arrow 150, it is equal to or less than the maximum desirable air gap. The signal generating means is represented, for example, by a slot 151 formed in the rotor disk 143. Thus, the walls 144 and 145 limit the axial movement of the disk 143.

The vehicle wheel speed sensors of the present invention provide many advantages that were lacking in the prior art speed sensors. The location in the axle shaft housing protects the sensors from damage during maintenance of the wheels. The mounting bracket protects the sensor against damage during assembly and disassembly of the differential axle shafts. Only minor changes need to be made in adding a second spline to the axle shaft, a pad and mounting holes for the bracket, and a hole in the housing for the sensor wire. Additional advantages are that the sensor/disk air gap is controlled by the assembly of the present invention and does not have to be set by the user, there is no effect on normal axle functions, there is substantial interchangeability between parts used for different models of axles, normal differential servicing does not affect the sensor, and sensor servicing does not affect the differential.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for sensing the angular speed of a wheel mounted on the end of a drive axle of a vehicle, the drive axle including a housing enclosing an axle shaft and a differential carrier assembly with a side gear for rotating the axle shaft and an associated wheel, comprising:

a rotor disk having means for indicating the angular speed of rotation formed thereon and means for coupling said rotor disk for rotation with an axle shaft;

an inner mounting bracket including an aperture for receiving the axle shaft and means for attaching to an inner wall of a housing for an axle shaft;

an outer mounting bracket having an aperture for receiving an axle shaft and being attached to said inner mounting bracket, said inner and outer mounting brackets defining a recessed cavity area for retaining and limiting axial movement of said rotor disk; and means for mounting a sensor adjacent said means for indicating for detecting the passage of said means for indicating as an axle shaft rotates said rotor disk and whereby a predetermined air gap is maintained between said sensor and said rotor disk.

2. The apparatus according to claim 1 wherein said means for coupling includes a central aperture formed in said rotor disk for receiving an axle shaft and a plurality of radially inwardly extending teeth formed about a periphery of said rotor disk aperture for engaging a splined portion of the axle shaft.

3. The apparatus according to claim 1 wherein said means for coupling includes a shaft coupling ring having an aperture with radially inwardly extending teeth formed therein for engaging a splined surface on an axle shaft, and an intermediate ring having an aperture formed therein for receiving the axle shaft and axially extending tabs formed thereon for engaging slots formed in facing surfaces of said shaft coupling ring and said rotor disk.

4. The apparatus according to claim 1 wherein said means for indicating includes a plurality of generally radially extending slots formed adjacent a periphery of said rotor disk.

5. The apparatus according to claim 1 wherein said means for indicating includes a plurality of generally radially extending teeth formed on a surface of said rotor disk facing said inner mounting bracket.

6. The apparatus according to claim 1 wherein said means for attaching includes a flange extending generally parallel to an axis of said aperture in said inner mounting bracket and fastening means for attaching said flange to the inner wall of the housing.

7. The apparatus according to claim 1 wherein said inner mounting bracket has a recessed area formed therein and said recessed areas face each other and cooperate to form said cavity and rotatably retain said disk.

8. The apparatus according to claim 1 wherein each of said inner and outer mounting brackets includes a generally planar retaining plate and said means for attaching includes welding for retaining said plates in an abutting relationship.

9. The apparatus according to claim 1 wherein each of said inner and outer mounting brackets includes a generally planar retaining plate and said means for attaching includes a plurality of fasteners for retaining said plates in an abutting relationship.

10. The apparatus according to claim 1 wherein said means for mounting is a mounting tube formed on said inner mounting bracket for retaining said sensor.

11. The apparatus according to claim 1 wherein said inner and outer mounting brackets are formed as a generally U-shaped body and said cavity is formed as an inwardly facing groove in said body.

12. A speed sensing system for a pair of wheels mounted on opposite ends of a drive axle of a vehicle, comprising:
a vehicle drive axle including a housing enclosing a pair of axle shafts and a differential with a pair of side gears for rotating said axle shafts and associated wheels;
a pair of rotor disks each having a plurality of generally evenly spaced radially extending indicating means formed thereon and means for coupling each said rotor disk for rotation with an associated one of said axle shafts;
a pair of mounting brackets mounted inside said housing enclosing the axle shafts, each said mounting bracket having an aperture formed therein for receiving said axle shaft and having a sensor mounting tube, each said mounting bracket having a cavity formed therein for retaining an associated one of said rotor disks; and
a pair of sensors each mounted in an associated one of said mounting tubes for detecting the passage of said indicating means when said side gears rotate said axle shafts and said rotor disks whereby said cavities maintain a predetermined air gap between each said sensor and a periphery of an associated one of said rotor discs.

13. The system according to claim 12 wherein said indicating means are a plurality of slots formed adjacent a periphery of said disk.

14. The system according to claim 12 wherein said indicating means are a plurality of teeth formed on a surface of said disk facing said inner mounting bracket.

15. A speed sensing apparatus for a wheel mounted on the end of a drive axle of a vehicle, the drive axle including a housing enclosing an axle shaft and a differential with a side gear for rotating the axle shaft and an associated wheel, comprising:
a disk having a plurality of generally evenly spaced radially extending indicating means formed adjacent a periphery thereof, an aperture formed therein, and a plurality of radially extending teeth formed in a wall of said aperture for coupling said disk for rotation with an axle shaft;
a mounting bracket mounted inside a housing enclosing the axle shaft, said mounting bracket having a central aperture formed therein for receiving the axle shaft and having at least one mounting tube for a sensor formed therein, said mounting bracket having a cavity formed therein in communication with said central aperture for rotatably retaining said disk; and
a sensor mounted in said one mounting tube for detecting the passage of said indicating means when the side gear rotates the axle shaft and said disk whereby opposed walls of said cavity limit axial movement of said disk to maintain a predetermined air gap between said sensor and said disk.

16. The apparatus according to claim 15 wherein said disk includes a shaft coupling ring having said aperture and said teeth formed therein, a signal generator disk having said indicating means formed thereon and having an axle shaft receiving aperture formed therein, and an intermediate disk having an axle shaft receiving aperture formed therein and having a plurality of generally axially extending tabs formed thereon engaging corresponding slots formed in said shaft coupling ring and said signal generator disk.

17. The apparatus according to claim 15 wherein said mounting bracket has a generally U-shaped body and said cavity is formed as an inwardly facing groove in said body.

18. The apparatus according to claim 15 wherein said mounting bracket includes a generally tubular body for guiding an axle shaft into said axle receiving apertures.

19. The apparatus according to claim 15 wherein said mounting tube extends in a direction generally parallel to the longitudinal axes of said axle receiving apertures.

20. The apparatus according to claim 15 including a pair of said mounting tubes positioned on opposite sides of said central aperture, each of said mounting tubes having a slot formed therein for retaining wires connected to said sensor to prevent rotation of said sensor in said mounting tubes.

* * * * *